July 27, 1926.  
A. C. STEWART  
1,594,132  
ROTARY MACHINE  
Filed August 20, 1924  
2 Sheets-Sheet 1
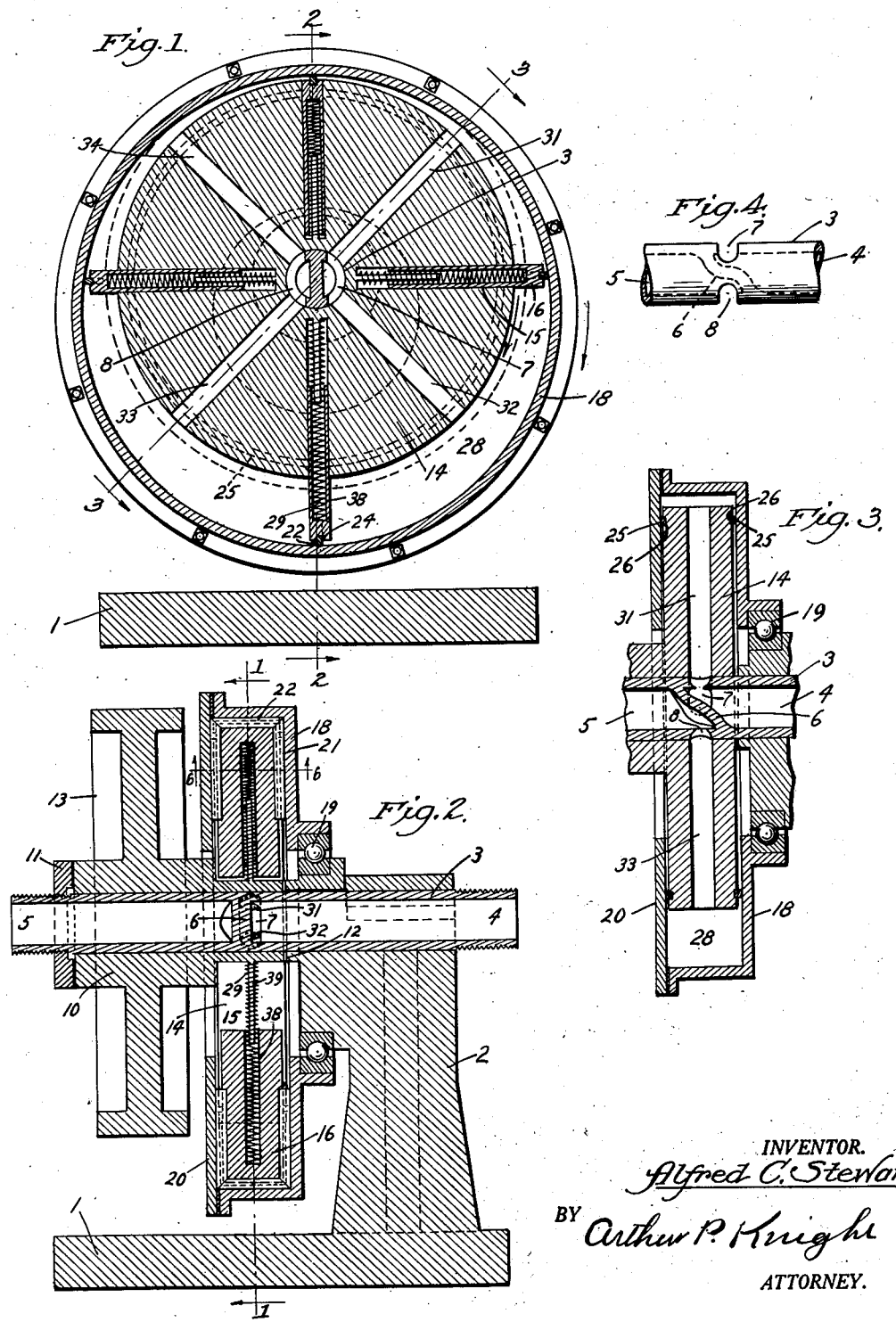
INVENTOR.  
Alfred C. Stewart  
BY Arthur P. Knight  
ATTORNEY.

July 27, 1926.
A. C. STEWART
ROTARY MACHINE
Filed August 20, 1924
1,594,132
2 Sheets-Sheet 2
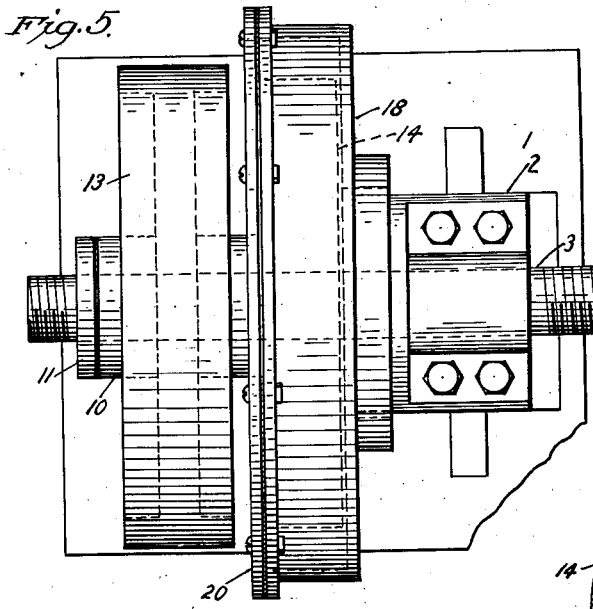
INVENTOR.
Alfred C. Stewart,
BY Arthur P. Knight
ATTORNEY.

Patented July 27, 1926.

1,594,132

UNITED STATES PATENT OFFICE.

ALFRED C. STEWART, OF ALTADENA, CALIFORNIA.

ROTARY MACHINE.

Application filed August 20, 1924. Serial No. 733,051.

This invention relates to a rotary machine adapted for use either as a pump or as an engine or motor and the main object of the invention is to provide a rotary machine of the sliding vane type which will present minimum sliding friction and consequent maximum economy in operation as well as durability.

The accompanying drawings illustrate embodiments of my invention and referring thereto:

Fig. 1 is a transverse vertical section of the machine on line 1—1 in Fig. 2.

Fig. 2 is a vertical longitudinal section on line 2—2 in Fig. 1.

Fig. 3 is a section on line 3—3 in Fig. 1.

Fig. 4 is a partial plan view of the shaft of the machine.

Fig. 5 is a plan view of the machine.

Fig. 6 is a section on line 6—6 in Fig. 2.

Fig. 7 is a diagrammatic vertical section showing the arrangement of the ports for operation with liquid.

Fig. 8 is a similar view to Fig. 7, showing arrangement of the ports for operation with an elastic fluid or gas.

Figs. 9 to 12 are diagrammatic transverse vertical sections of a modified form of the invention, said sections showing successive positions of the sliding vanes.

Fig. 13 is a horizontal section of a shaft suitable for use with the form shown in Figs. 9 to 12.

Fig. 14 is a section on line 14—14 in Fig. 13.

Fig. 15 is a section on line 15—15 in Fig. 13.

Referring to Figs. 1 to 5 my improved rotary machine comprises a frame, having for example a base 1 and a standard 2 in which is mounted in fixed position shaft 3, said shaft having an inlet passage 4 at one end and an outlet passage 5 at the other end, said passages being separated from one another by a partition 6 in the shaft, and said passages communicating respectively with ports 7 and 8 in the wall of the shaft.

A rotary member 10 is mounted on shaft 3 so as to rotate thereon, being for example retained by a collar 11 fixed on the shaft and a shoulder 12 on the standard 2. Said rotary member 10 may be provided with suitable driving means, for example a pulley 13 formed thereon or secured thereto, and may be further provided or formed with a vane carrying portion 14, which may be formed as a disc having radial slots 15 in which slide the respective vanes or reciprocating members 16. Cylinder 18 is rotatably mounted so as to enclose the carrier disc 14 and the vanes 16 carrier thereby, said cylinder being for example mounted to rotate on ball bearing 19 on the standard 2 and having a head 20 which may be removably fastened to the body of the cylinder. Head 20 and the inwardly extending wall of cylinder 18 constitute end walls extending inwardly to embrace the rotary member 10.

Suitable packing means are provided for maintaining liquid or gas tight engagement between the vanes and carrier member and the walls of the cylinder 18. For this purpose packing strips 21 and 22 may be provided, slidably mounted in grooves 23 and 24 respectively in the sides and outer end of the respective vanes, and packing members formed for example as quadrants 25 may be slidably mounted in annular grooves 26 in the respective sides of the carrier member 14. Each of the packing members 21, 22, and 25 may consists of metal or other suitable material either sufficiently elastic in itself, or provided with suitable pressure springs in the usual manner in packing devices of this character, to hold the packing member in tight engagement with the wall of the cylinder; and in case said packing members are of metal they may comprise elements arranged side by side and overlapping one another at the ends so as to provide for more effective maintenance of the gas or liquid tight joint in the usual manner of such devices.

The bearing 19 for the rotary cylinder 18 is mounted eccentrically with respect to the shaft 4 of the rotary member 10 so that a space 28 is provided between said cylinder and the carrier member 14, which serves as a working chamber for the engine or pump. The respective vanes 16 work in said chamber and are always maintained in contact with the peripheral wall of the cylinder 18 either by centrifugal action or by suitable springs, such for example as indicated at 29. Said springs may be partly enclosed in recesses 38 in the sliding vanes 16 and suitable guide means may be provided, such as pins 39 mounted or formed on the hub of carrier member 14. In case the pump or engine is working at sufficiently high speed, such springs may be omitted as the centrifugal force on the vanes is in such cases sufficient to force them outward against the wall of the cylinder during operation. As shown in the drawings four of the vanes 16 may be arranged 90° apart in the carrier member 14 but it will be understood that any desired number of such vanes greater than one may be used.

The operation of the apparatus above described is as follows:

Assuming that the machine is to be used as a pump the inlet 4 is connected by suitable piping to a source of supply of liquid or fluid to be pumped and the outlet 5 is connected to piping to conduct the pumped fluid to any desired place. Assuming that the machine is operated by power applied to pulley 13 so as to move the rotary member 10 in the direction indicated by the arrow in Figs. 1 and 7, the respective vanes 16 will sweep around the interior of the cylinder 18 and in contact with the walls of said cylinder in such manner as to always divide the interior of working space 28 into a plurality of chambers, in this case four chambers which are alternately increased or decreased in size so as to produce a pump action. In the position of the parts shown in Fig. 1 the inlet 4 is connected through port 7 in the shaft 3 with the passages 31 and 32 in the rotary disc 14 leading to the two cylinder chambers which are being increased in size by the rotation of the rotary member whereas the outlet 5 is connected through port 8 with the passages 33 and 34 communicating with the cylinder chambers which are being decreased in size by the movement of the vanes 16 with the result that the fluid will be continually drawn in at the inlet 4 and expelled at the outlet 5. When the parts reach the position shown in Fig. 7 one of the cylinder chambers namely the one shown at the top of said figure is at a condition of minimum volume whereas the opposite or lowermost chamber is at a condition of maximum volume and at this moment the passages 34 and 32 communicating with these cylinder chambers may be closed by imperforate portions of the shaft 3 as indicated in said figure, this being the point at which the said passages 34 and 32 interchange communication from inlet to outlet and vice versa. It will be seen, therefore, that each working chamber is placed in communication with the inlet port 7 throughout substantially the entire period during which its volume is being increased, and with the outlet port 8 while its volume is being decreased.

In the rotation of the rotary member 10 as above described the cylinder 18 is carried around by reason of the frictional engagement of the reciprocating members or vanes 16 therewith so that the members 14 and 18 revolve at approximately the same speed and there is a minimum of friction between such members. Substantially the only friction is that due to the relative movement of the members on account of the eccentricity of the rotation of the said parts resulting in a slight sliding movement of the vanes relative to the carrier member and the side walls of the cylinder and a sliding motion of the packing quadrants 25 relative to the cylinder walls. By this reduction of the frictional loss I am enabled to operate the rotary machine at a very high velocity without undue friction and I am therefore able to obtain large working capacity in a machine of comparatively limited size.

In operating with an elastic fluid such as air or other gas or vapor it is generally necessary to provide for compression of the gas or vapor before expulsion and for this purpose, as shown in Fig. 8, the port 8 on the compression side may be made sufficiently short so as to provide for closure of each passage 31, etc., as it passes a closed portion, indicated at 35, of the shaft wall, until the corresponding cylinder chamber has reached a position which results in compression of the gas or vapor therein to a pressure equal to or greater than that existing in the outlet pipe or in the apparatus to which the gas or vapor is to be pumped. In the ensuing movement of the rotary member 14 progressive diminution of the volume of this cylinder chamber will result in expulsion of the gas or vapor so compressed.

It will be observed that in the above described form of the invention no provision is made for a tight fit between the rotary cylinder 18 and the rotary carrier member 15, there being a slight clearance between these members even at the position of minimum volume, as indicated at 37 in Fig. 7. With such a construction the working chambers are always defined between adjacent sliding vanes and between the inner wall of cylinder 18 and the outer wall of carrier member 14.

In some cases, however, I may prefer to provide for a close fluid-tight fit between said members at such point, as in the form shown in Figs. 9 to 15. In this case I have shown the carrier member 14 as provided with but two sliding vanes 16 and 16', adapted to slide in and out in slots 15 and make contact at their outer ends with the inner wall of cylinder 18, but it will be understood that four or any other desired number of vanes may be used with this form also. The method of mounting shaft 3, cylinder 18 and carrier member 14, and the provision of driving means for the latter, may be substantially the same as in the other form of the invention, and it will also be understood that the vanes 16 and 16' may be provided with means similar to those above described for forcing them outwardly against the cylinder walls and that suitable packing means may be provided for making a fluid-tight joint between said vanes and carrier member and the side walls of cylinder 18.

In this form of the invention carrier member 14 is adapted to fit tightly against the inside of cylinder 18 at the top of the machine as indicated at 40, so as to provide a fluid-tight rolling contact at this point. Inlet passages 41 and outlet passages 42 are provided in carrier member 14 at opposite sides of the respective sliding vanes, and said passages are adapted to register respectively with inlet and outlet ports 7 and 8 in shaft 3. Said ports 7 and 8 are offset in this case as shown in Fig. 13, and communicate respectively with inlet and outlet passages 4 and 5 which are separated by partition 6 within shaft 3.

In the operation of this form of the invention, for example as a pump, the machine may be rotated in the direction indicated by the arrows in Figs. 9 to 12 by application of power to driving means 13. Due to the tight fit between carrier member 14 and cylinder 18, the working space between said members is divided, during substantially the entire cycle, into three working chambers as indicated at 43, 44, and 45.

In the position shown in Fig. 9 chamber 43 is starting its intake stroke, its inlet passage 41 having just begun to register with inlet port 7. Chamber 44 is nearing the end of its intake stroke, while chamber 45 is discharging, as may be readily seen by comparing the position of its outlet passage 42 with the position of outlet port 8 as shown more clearly in Fig. 15. It will be observed that in this form of the invention the intake stroke of each chamber lasts during approximately three-fourths of a revolution of the rotary members and so does the discharge stroke, so that the complete cycle for any one chamber lasts during one and one-half revolutions. The maximum volume is that represented by chamber 44 in Fig. 10 and it will be seen that this chamber is at this time changing from the intake to the discharge portion of its cycle. It will also be seen that the minimum volume of each chamber is practically zero, since chamber 45 (see Fig. 11) will completely disappear by the time the parts reach the position shown in Fig. 12. This form of the invention therefore has the advantage of completely eliminating or discharging all fluid taken in during any cycle, but the necessity of maintaining a fluid-tight contact between the rotary members may in some cases offset this advantage. In case the pump is intended to handle an elastic fluid, such as air or other gas or vapor, provision may be made for any desired compression of the fluid before discharge, as in the form first described, by simply reducing the arc through which outlet port 8 extends in such manner as to retard the opening of the outlet passages 42.

As stated above, if the speed of rotation of the machine is sufficiently high to force the sliding vanes outwardly against the wall of the cylinder by centrifugal force during operation, the springs 29 may be eliminated. In such cases the machine has the additional advantage that the vanes are not forced outwardly, and consequently the pumping action does not start, until the machine has reached approximately its normal speed. This is frequently of considerable advantage in permitting the machine to be started without any load thereon, especially in case it is driven, for example, by a gasoline engine, in which case no clutch device will be necessary between the engine and the pump.

While I have described the operation of this machine as a pump, it will be evident that it is equally well adapted for use as an engine, in which case working fluid may be led in through one end of shaft 3 and discharged through the other end and power may be obtained from driving means 13 for example by connecting said driving means through a belt or otherwise to the mechanism to be driven. If the working fluid is a liquid it may be introduced through either end of the shaft, the inlet and outlet ports being formed as described above for use as a pump in connection with a non-compressible fluid. On the other hand, if the working fluid is a gas or elastic fluid introduced under pressure, the valve ports in the shaft should be formed as described for use as a pump with such a fluid, for example as shown in Fig. 8, and such gas, for example compressed air or steam, should in that case be introduced through the passage 5 (at the end which serves as the outlet when used as a pump) so as to permit such fluid to expand within the working chambers before beginning to discharge, and the direction of rotation would then be the reverse of that indicated by the arrows in said figure.

What I claim is:

1. A rotary machine comprising a cylinder mounted to rotate on its axis and having end walls extending inwardly toward its center, a rotary member mounted to rotate on an axis eccentric to that of the said cylinder and having a portion extending within said cylinder and between the end walls thereof, reciprocating members mounted in said portion of said rotary member within said cylinder in such manner as to be slidable radially within said cylinder and to engage with the walls of the cylinder so as to divide the interior of the cylinder into a plurality of working chambers, inlet and outlet ports, a plurality of passages in said rotary member each communicating with one of said working chambers, in the cylinder, and adapted to register with said inlet and outlet ports in the rotation of said rotary member and driving means on said rotary member for rotating the same to cause operation of said reciprocating members within said cylinder, resulting in rotation of the said cylinder with said rotary member and in radial sliding movement of said vanes so as to cause alternate increase and decrease in size of the said working chambers within said cylinder.

2. A rotary machine comprising a stationary shaft provided with inlet and outlet passages and with ports communicating with said passages, a rotary member mounted to rotate on said shaft and provided with driving means and with a portion extending over said ports in said shaft and having passages intermittently communicating with said ports in the rotation of said rotary member, vanes slidably mounted in said portion of the rotary member, and a cylinder surrounding said rotary member and the vanes therein and mounted to rotate on an axis eccentric to said stationary shaft and having end walls embracing said rotary member, said sliding vanes cooperating with said cylinder to divide the interior of the cylinder into a plurality of working chambers which will alternately decrease and increase in size in the rotation of said rotary member and cylinder, the said passages in said rotary member communicating with the said working chambers to provide for inflow of fluid from said inlet passage to each of said working chambers throughout substantially the entire period during which the same is being increased in size, and for outflow of fluid from each of said working chambers to said outlet passage while the same is being decreased in size In testimony whereof I have hereunto subscribed my name this 31st day of July 1924.

ALFRED C. STEWART.